US012623858B2

(12) United States Patent
Kieser et al.

(10) Patent No.: US 12,623,858 B2
(45) Date of Patent: May 12, 2026

(54) CONTROL DEVICE FOR A CARGO LOADING SYSTEM, CARGO LOADING SYSTEM, AND METHOD FOR POSITIONING CONTAINERS AND/OR PALLETS ON A CARGO DECK OF A CARGO AIRCRAFT

(71) Applicant: TELAIR INTERNATIONAL GMBH, Miesbach (DE)

(72) Inventors: Benedikt Kieser, Hausham (DE); Marcos Mengual Hinojosa, Miesbach (DE); Matthias Urch, Egmating (DE)

(73) Assignee: TELAIR INTERNATIONAL GMBH, Miesbach (DE)

( * ) Notice: Subject to any disclaimer, the term of this patent is extended or adjusted under 35 U.S.C. 154(b) by 969 days.

(21) Appl. No.: 17/743,279

(22) Filed: May 12, 2022

(65) Prior Publication Data

US 2022/0363392 A1     Nov. 17, 2022

(30) Foreign Application Priority Data

May 14, 2021     (DE) .......................... 102021112593.6

(51) Int. Cl.
B65G 43/10          (2006.01)
B60Q 3/30          (2017.01)
(Continued)

(52) U.S. Cl.
CPC ............... B65G 43/10 (2013.01); B60Q 3/30 (2017.02); B64D 9/00 (2013.01); G08B 5/36 (2013.01);
(Continued)

(58) Field of Classification Search
CPC ...... B65G 43/10; B65G 2203/02; B60Q 3/30; B64D 9/00; G08B 5/36; G06Q 10/087
See application file for complete search history.

(56) References Cited

U.S. PATENT DOCUMENTS 6,308,131 B1 * 10/2001  Fox ........................ G01G 19/07
                                                                      177/136
8,515,656 B2      8/2013  Reed et al.
                              (Continued)

FOREIGN PATENT DOCUMENTS

DE          102005019194          11/2005
DE          102005026898          1/2006
                    (Continued)

*Primary Examiner* — Ernesto A Suarez
*Assistant Examiner* — Laurence R Brothers
(74) *Attorney, Agent, or Firm* — BARNES & THORNBURG LLP

(57)          ABSTRACT
A control device for a cargo loading system on a cargo deck of a cargo aircraft. The control device includes a plurality of selection switch elements each for selecting a loading configuration from a plurality of possible loading configurations, at least one first indicator device, comprising a display for outputting an at least partial depiction of the cargo deck, at least one second indicator device to be arranged (directly) on the cargo deck, in particular on system components of the cargo loading system, and a computing unit. The computing unit is configured to: a) determine a selected loading configuration based on signals from at least some of the selection switch elements; b) using the selected loading configuration, determine an identification region on the cargo deck and/or an identification selection of system components; and c) visualize the identification region and/or the identification selection using the first indicator device and the second indicator device (simultaneously).

14 Claims, 4 Drawing Sheets

(51) Int. Cl.
  *B64D 9/00* (2006.01)
  *G06Q 10/087* (2023.01)
  *G08B 5/36* (2006.01)
(52) U.S. Cl.
  CPC ....... *B65G 2203/02* (2013.01); *G06Q 10/087* (2013.01)

(56) References Cited

U.S. PATENT DOCUMENTS

| | | | |
|---|---|---|---|
| 8,925,860 | B2 | 1/2015 | Huber et al. |
| 9,162,765 | B2 | 10/2015 | Huber |
| 2005/0246057 | A1* | 11/2005 | Olin ....................... B64D 9/003 |
| | | | 244/118.1 |
| 2005/0246132 | A1* | 11/2005 | Olin ......................... B64D 9/00 |
| | | | 702/174 |
| 2006/0038077 | A1* | 2/2006 | Olin ....................... G06Q 10/08 |
| | | | 244/137.1 |
| 2008/0167760 | A1 | 7/2008 | Scherenberger et al. |
| 2010/0100225 | A1* | 4/2010 | Reed ......................... B64D 9/00 |
| | | | 701/124 |
| 2013/0297065 | A1 | 11/2013 | Huber |
| 2013/0313073 | A1* | 11/2013 | Huber ..................... B64D 9/00 |
| | | | 198/464.2 |
| 2015/0364016 | A1 | 12/2015 | Noe et al. |
| 2018/0029707 | A1* | 2/2018 | Levron ................. B64D 9/003 |
| 2018/0111698 | A1* | 4/2018 | Podnar ................ G06Q 10/043 |

FOREIGN PATENT DOCUMENTS

| | | |
|---|---|---|
| DE | 102007001529 | 7/2008 |
| DE | 102009037982 | 5/2010 |
| DE | 102011000819 | 8/2012 |
| EP | 2418145 | 2/2013 |
| WO | WO 01/90707 | 11/2001 |

* cited by examiner

L1:

L2:

L3:

L4:

ULD

10

S1

S2

S3

S4

11

17

10a

F
11

10
T
S

11
F

L1

K
S

CONTROL DEVICE FOR A CARGO LOADING SYSTEM, CARGO LOADING SYSTEM, AND METHOD FOR POSITIONING CONTAINERS AND/OR PALLETS ON A CARGO DECK OF A CARGO AIRCRAFT

CROSS REFERENCE TO RELATED APPLICATIONS

This application claims priority to German Patent Application No. 102021112593.6, filed May 14, 2021. The disclosure set forth in the referenced application is incorporated herein by reference in its entirety.

FIELD OF THE DISCLOSURE

The invention relates to a control device for a cargo loading system, a cargo loading system, and a method for positioning containers and/or pallets on a cargo deck of a cargo aircraft.

BACKGROUND

To transport air cargo, pieces of cargo, such as containers and/or pallets ("unit load devices"—ULDs), the dimensions of which usually meet defined norms, are fastened within a cargo space of a cargo aircraft by means of bolt elements on the cargo deck of the cargo space. Such bolt elements often form cargo loading paths, between which the normed pieces of cargo can be positioned. To position the pieces of cargo at the positions provided for them, cargo loading systems are used which assist the ground personnel during loading and unloading.

To make the loading and unloading process as efficient as possible, the cargo decks have, for example, ball mats, which enable the pieces of cargo to be transported with little application of force on the cargo deck. Furthermore, cargo conveyor devices such as roller drive units ("PDUs: power drive units") are regularly provided, which apply the force required for the transport.

Nonetheless, ground personnel cannot be omitted during loading and unloading of the cargo, since many loading processes are very individual due to different loading configurations, dimensions of the pieces of cargo, excesses, etc. In EP 2 418 145 A2, for example, a cargo space floor or cargo deck is described, which offers a variety of possible loading configurations. Such a variety of possible loading configurations can quickly become confusing during a loading or unloading process—in particular if it is necessary to work under high time pressure.

However, special loading and unloading processes of cargo aircraft generally have to take place under ultrahigh time pressure, since every minute which an aircraft spends on the ground causes operator-side costs. Especially in the case of frequently changing cargo having different dimensions, aircraft types, cargo systems, loading configurations, etc., the responsible personnel can thus easily make errors in the handling of a corresponding cargo loading system.

Such an operating error can have the result that, for example, sections of the cargo deck, the entire cargo deck, or system components of the cargo loading system are damaged.

However, such operating errors absolutely have to be prevented, since a defective cargo loading system can result in significant costs. Repairing or replacing corresponding system components or entire sections of the cargo deck is very expensive.

SUMMARY

The present invention is based on the object of providing a control device and a corresponding method for positioning containers and/or pallets on a cargo deck of a cargo aircraft having improved intuitive handling to exclude an operating error as much as possible and to avoid problems and/or delays during the loading of the cargo deck.

This object is achieved in accordance with the present disclosure.

In particular, the object is achieved by a control device for a cargo loading system on a cargo deck of a cargo aircraft, wherein the control device comprises the following:

a plurality of selection switching elements for selecting a loading configuration in each case;

at least one first indicator device having a display to output an at least partial depiction of the cargo deck, at least one second indicator device for the (direct) arrangement on the cargo deck or on system components of the cargo loading system; and a computing unit, which is designed to:

a) determine a selected loading configuration based on signals of at least some of the selection switching elements;

b) using the selected loading configuration, determine an identification region on the cargo deck and/or an identification selection of system components;

c) visualize the identification region and/or the identification selection using the first indicator device and the second indicator device (simultaneously).

The object is also achieved by a control device for positioning containers and/or pallets for cargo loading system on a cargo deck of a cargo aircraft, wherein the control device comprises the following:

a plurality of selection switching elements for selecting a loading configuration in each case;

an indicator device, comprising at least one first indicator device, in particular a display, which is arranged in the cargo space, and at least one second indicator device, which is arranged directly on the cargo deck or in/on system components of the cargo loading system, to assist positioning of the containers and/or pallets on the cargo deck; and a computing unit, which is designed to receive a respective selection signal from each of the plurality of selection switching elements and is designed to cause the indicator device to visualize a region in which corresponding system components are arranged for loading in the respective loading configuration and/or a position of the loading configuration to be loaded on the cargo deck.

One concept of the invention is to make the control of a cargo loading system sufficiently simple and intuitive that problems and delays which can possibly arise due to a lack of comprehension of the control of the cargo loading system are drastically reduced. Upon a corresponding control and setting of a loading configuration by the control device according to the invention, the cargo space outline of the cargo aircraft having the cargo loading system is indicated for this purpose on a display in the cargo space and an identification region, for example, a region which is relevant for the set or active loading configuration, is displayed thereon. Additionally, the selected or active positions or regions for a corresponding loading configuration are indicated directly using lights on the cargo deck. I.e., the regions indicated by the display in the cargo space are additionally also emphasized using further lights in the cargo space.

In other words, a core concept of the invention can be considered that an essentially simultaneous visualization takes place in the virtual space (on the monitor or display) and in the physical space (on the cargo deck).

Identification regions can thus be displayed or highlighted (identified). These can be understood as (partial) regions of the cargo deck or positions on the cargo deck, at/in which, for example, pieces of cargo, in particular ULDs such as containers and/or pallets are arranged or are to be arranged.

Alternatively or (preferably) additionally, an identification selection of system components can also be displayed or highlighted (identified). This can be understood to mean that one system component or the selection of system components, the operation of which is required for a loading maneuver, is displayed or highlighted.

This enables the ground personnel to comprehend the settings of the cargo loading system in a particularly simple manner and to control the loading process intuitively, even without special prior knowledge.

In particular, the described visualization of the regions or the selection can take place before the actual loading process of the cargo by means of the control device, to first check whether the settings are the desired ones. The double display of identification region/identification selection (virtually and in the cargo space) can also be used to give suggestions. For example, to indicate possible loading positions for a specific cargo to the ground personnel.

In one embodiment, the at least one display for outputting the at least partial depiction of the cargo deck is designed in such a way that the identification region and/or the identification selection is visualized in/as part of the depiction.

This enables possible loading configurations to be indicated graphically or virtually on the display of the operating panel directly at an operating panel. Correspondingly, in this way a correct or desired loading configuration can be set or adjusted (reconfigured) quickly and easily. This enables the responsible ground personnel to receive a quick overview of the present situation in spite of frequently changing conditions and a loading process under time pressure. The handling is thus significantly improved overall and loading processes can be handled quickly and smoothly.

In one embodiment, the second indicator device has a plurality of light source arrangements to be arranged on the cargo deck and/or on the system components, wherein the computing unit has a communicative connection, in particular via a bus, to the second indicator device.

In this way, it is made possible to create or visualize a direct overview of a selected or active loading configuration directly on the cargo deck. The cargo loading system can be (re-)configured quickly, easily, and intuitively in accordance with the incoming cargo in this way.

An arrangement of the light sources on the system components can be understood to mean that one or more light sources (depending on the type of the system component) can be attached to the system components, but also can be integrated in a housing (if the system component has a housing) or can be integrated in another element of a system component.

The computing unit can furthermore be designed to activate the second indicator device or the light source arrangements, for example, via a bus system, in particular to switch them on and off accordingly.

In one embodiment, each light source arrangement has a plurality of light sources, for example LEDs. The light sources are combined into groups in such a way that the identification region and/or the identification selection on the cargo deck can be visualized by means of the light source arrangements.

In one embodiment, the light source arrangements are arranged on or in system components, preferably on roller drive units.

In this way, an (optical) assignment of the system components which are active or to be activated can be further improved.

In one embodiment, the computing unit is designed to receive first and second control signals from at least one control means device of the control device and as a reaction to the first control signal to determine the identification region on the cargo deck and/or the identification selection of system components, and/or in reaction to the second control signal to activate system components in the identification region and/or the identification selection of system components.

The first control signal can contain, for example, items of information with respect to a (cargo) direction (left, right, forward, back) and can determine the identification region and/or the identification selection accordingly and/or update it (upon change of the first control signal). An intuitive and controlled loading process of the cargo at the desired positions in the corresponding loading configuration is enabled in this way.

In one embodiment, the computing unit is designed to communicate with a storage unit, wherein items of information with respect to a cargo space outline and/or items of information with respect to the plurality of loading configurations are stored on the storage unit.

On the one hand, it is thus made possible to enable the depiction of the cargo deck and the loading configurations or the identification regions and/or the identification selection on the cargo deck. On the other hand, the flexibility of the control device is thus increased. Thus, for example, depending on the aircraft type and/or cargo loading system, corresponding data or items of information with respect to a corresponding cargo space outline can be loaded on the storage unit. Updates of items of information or data with respect to possible loading configurations or changed cargo dimensions may thus also be implemented quickly and cost-effectively.

In particular, the object according to the invention is also achieved by a cargo loading system of a cargo aircraft, wherein the cargo loading system comprises a control device as was described in the preceding paragraphs.

The same advantages result therefrom as were already described in conjunction with the control device.

Moreover, it is to be noted that the features and advantages described in the scope of the control device according to the invention also apply to the cargo loading system according to the invention. Features of the control device are transferable to the cargo loading system according to the invention.

In one embodiment, at least one display of the control device is arranged on an operating panel in the vicinity of a cargo door of the cargo aircraft and a plurality of light source arrangements is arranged on the cargo deck and/or on system components of the cargo loading system, preferably on/in roller drive units, to assist positioning of containers and/or pallets.

In particular, the object according to the invention is also achieved by a method for positioning containers and/or pallets for a cargo loading system on a cargo deck of a cargo aircraft, in particular by means of a control device as described in the preceding paragraphs, wherein the method comprises the following steps:

selecting a loading configuration from a plurality of possible loading configurations for containers and/or pallets on the cargo deck;

determining an identification region on the cargo deck and/or an identification selection of system components using the selected loading configuration;

(simultaneously) visualizing the identification region or the identification selection on at least one first indicator device having a display in the cargo space and using at least one second indicator device on the cargo deck, in particular on system components (S) of the cargo loading system.

The same advantages result therefrom as were already described in conjunction with the control device and/or the corresponding cargo loading system.

Features of the method according to the invention are also transferable to the control device according to the invention or the cargo system, in that the corresponding device is configured in such a way that it is capable of executing the corresponding method features.

In one embodiment, a graphic visualization of the identification region and/or the identification selection takes place on the display in the cargo space with reference to a cargo space outline of the cargo aircraft.

In this way, the loading process can be virtually displayed or reproduced on the display in the corresponding loading configuration, (beforehand, before the start of a loading process), to recognize possible avoidable sources of error or interference beforehand and not let them occur at all during the actual loading process. A loading process of the cargo can be intuitively optimized in this way and delays can be reduced.

In one embodiment, an optical visualization of the second indicator device is carried out by a light source arrangement which flashes or lights up for a predetermined time period directly on the cargo deck.

In this way, generating a direct overview with respect to the selected or active loading configuration directly on the cargo deck (in situ) is enabled. The cargo loading system can be (re-)configured quickly, easily, and intuitively in this way. An identification of the regions for the cargo to be arranged or the system components to be used can be enabled even in poor light conditions by corresponding light effects or flashing effects. Lighting up in a predetermined time period can involve, for example, a time parameter such as 1 s or 2 s. Alternatively, it is possible to restrict the time period of the lighting up to a duration in which a corresponding selection switching element is pressed.

In one embodiment, the method comprises a step for querying and visualizing an activated region or an activated loading configuration of the cargo loading system and/or a position of the cargo deck.

In this way, the responsible ground personnel are given a rapid and intuitive possibility for checking beforehand (before the actual loading process) which loading configuration or which system components for the corresponding loading configuration is/are activated at all presently (for example from a preceding loading process). Under certain circumstances, this saves an extensive inspection by the personnel on the cargo loading system itself, so that in case of a loading configuration which is already correctly set, almost no delay results and for the case of a required reconfiguration, this can be carried out quickly, in particular within a few seconds (for example less than 10 seconds), so that the loading process can overall take place quickly and smoothly.

In one embodiment, the method comprises a step for starting a loading process of the containers and/or pallets in accordance with the identification region and/or the identification selection.

In this way, the responsible ground personnel can operate the cargo loading system quickly and intuitively even without prior knowledge thereof, in order to avoid delays in the loading process.

In particular, the object according to the invention is also achieved by a computer-readable (storage) medium, which comprises instructions which, upon the execution by at least one computing unit, cause it to implement a method as described in the preceding paragraphs.

Preferred embodiments of the invention are disclosed herein.

BRIEF DESCRIPTION OF THE DRAWINGS

The invention is also described hereinafter with respect to further details, features, and advantages, which are explained in more detail on the basis of the figures. The described features and feature combinations, as shown hereinafter in the figures of the drawings and described on the basis of the drawings, are usable not only in the respective specified combination but also in other combinations or alone without thus leaving the scope of the invention.

In the figures.

DETAILED DESCRIPTION

Figure 1:
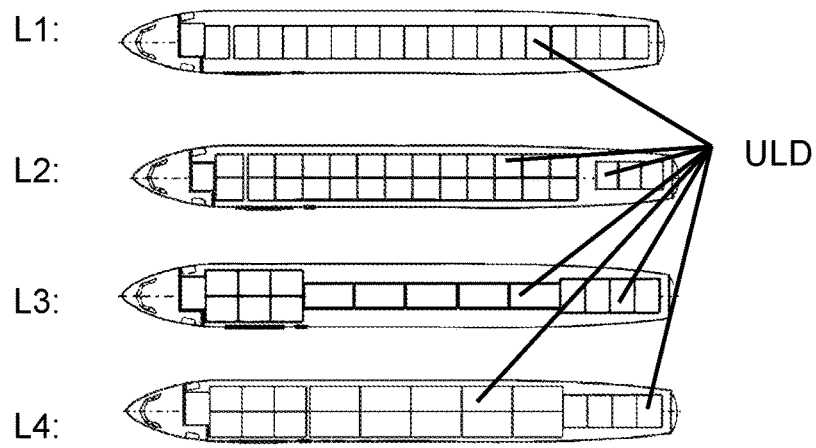
FIG. 1 shows an illustration of various exemplary embodiments of loading configurations for loading in a cargo space.

FIG. 1 shows a schematic illustration of four examples for possible loading configurations L1 to L4 for loading on a cargo deck of a cargo aircraft.

When loading takes place by means of a cargo loading system, for example, on an upper cargo deck or main deck, the loading can then be carried out in general using greatly varying types of ULDs (Unit Load Devices), for example, in the form of containers and/or pallets.

The cargo loading system is generally designed to offer different loading configurations. System components S (FIG. 3) such as guide elements and/or bolt elements and/or roller drive units are provided for this purpose on the cargo deck. The system components S furthermore comprise roller drive units for conveying ULDs.

In a first example for loading configuration L1, a "single-row" loading configuration (single-row central loading configuration) is shown. In this configuration, the ULDs are loaded in one row over an entire length of the cargo deck. This configuration is particularly suitable for transporting heavy ULDs having high distributed loads.

In the example for loading configuration L2, a side-by-side (two-row) loading configuration is shown in sections. In this configuration, the ULDs are loaded in the two rows and ULDs are possibly also placed in one row at a front end (left in FIG. 1) and at a rear end (right in FIG. 1) of the aircraft.

A third example of a loading configuration L3 also shows a mixed configuration having a partial single-row loading configuration. Thus, for example, lighter ULDs and moderately heavy ULDs can be loaded in the bow and stern.

This loading configuration L3 can in turn, for example, be reconfigured to form a fourth loading configuration L4, which accommodates two rows of ULDs in the middle section.

Further loading configurations result, for example, from arrangements similar to the loading configurations L1 to L4 shown for ULDs having other dimensions. For example, smaller and larger pallets, civil and military pallets.

In general, the loading personnel have an instruction document in which it is documented which ULDs are to be loaded in which sequence at which position.

To enable any loading using the freight loading system, there are main operating panels in the freighters in the entry region, using which an array of configuration settings are possible to enable a loading according to a predefined loading plan.

However, every cargo loading system is different in the operation and sometimes differs massively with respect to the control. That is to say, the ground personnel have to be trained on the various systems and are therefore supposed to operate such systems later in an error-free manner as possible, so as not to cause significant delays and problems during the loading.

The control device 10 according to the invention is to reduce problems and delays which can possibly arise due to a lack of comprehension of the system operation.

For this purpose, the control device 10 has an operating panel 10a. An exemplary embodiment of an operating panel 10a is shown in FIG. 2.

Figure 2:
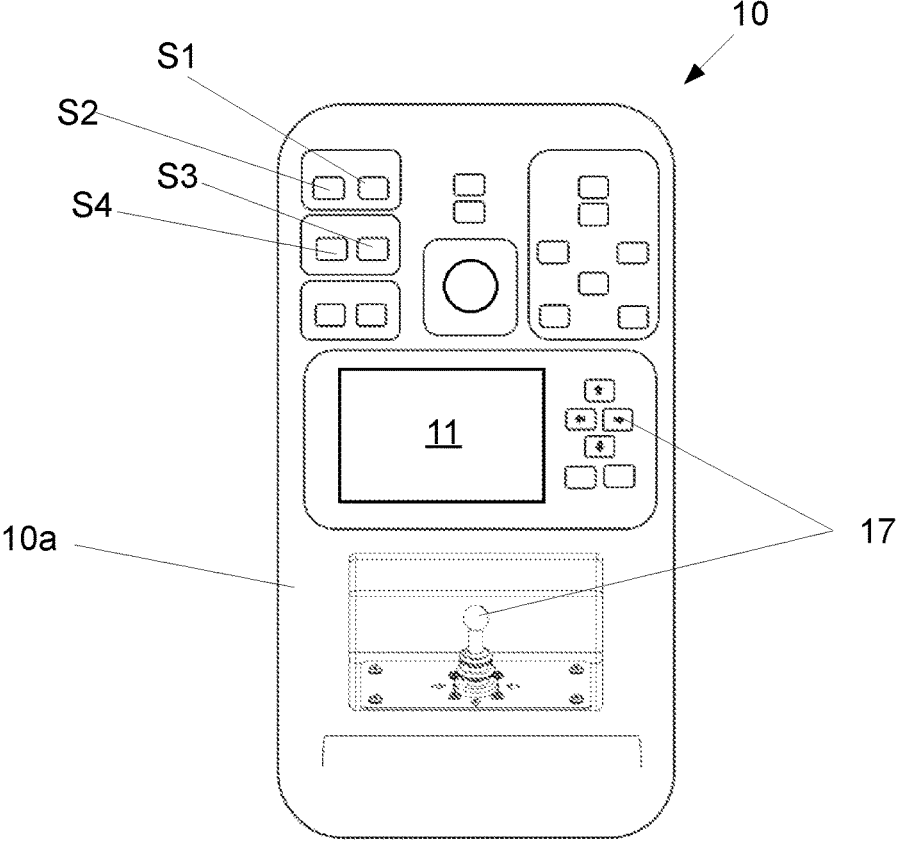
FIG. 2 shows an operating panel according to one exemplary embodiment of a control device according to the invention.

According to the exemplary embodiment shown in FIG. 2, the operating panel 10a has a display 11 and four selection switch elements S1 to S4. The selection switch elements S1 to S4 are designed in this exemplary embodiment as switches. Alternatively, the selection switch elements S1 to S4 can also be formed by a touchscreen (for example, also as part of the display 11).

Furthermore, the operating panel 10a has further switching and/or control means devices 17, for example, a joystick 17 and/or switches 17, for controlling a loading process by the system components, for example, the roller drive units, of the cargo loading system, in order to position the ULDs accordingly.

In the exemplary embodiment, the operating panel 10a is positioned in the vicinity of a cargo door T (FIG. 3) of the cargo aircraft.

The operating panel 10a has four selection switch elements S1 to S4 for the respective selection of a corresponding loading configuration L1 to L4. Thus, for example, the selection switch element S1 can be actuated for a loading configuration L1, etc.

In alternative exemplary embodiments, the number of the selection switch elements S1 to S4 (and accordingly the number of the loading configurations) can be significantly higher.

The selection switch elements S1 to S4 and the display 11 are each connected to a computing unit 12. According to the invention, the display 11 and/or the computing unit 12 is designed to represent a corresponding cargo space outline F of the aircraft graphically on the display 11, thus virtually.

According to one exemplary embodiment, corresponding positions of system components S or system component groups for a respective loading configuration L1 to L4 and the positions of the operating panel 10a and the cargo door T are also displayed on the cargo space outline F, in order to enable the best possible orientation within the (virtual) cargo space from the graphic indication.

If one actuates one of the selection switch elements S1 to S4, a selected loading configuration is thus graphically visualized on the display 11 within the cargo space outline F displayed there.

In one refinement of this exemplary embodiment, the display 11 can be made removable or mobile, so that it is suitable for mobile use, for example, within the cargo space and/or outside the cargo space (preferably in the vicinity of the cargo door). Alternatively or additionally, a second mobile display and/or at least one mobile terminal such as a smart phone or a tablet computer can be provided for a corresponding mobile use, on which according to the invention (via a corresponding app) an identification region K and/or an identification selection of system components S can be displayed and/or selected. Such a mobile use can be implemented, for example, via a Bluetooth or Wi-Fi connection (or another wireless connection) between the corresponding at least one mobile terminal and/or the display 11 and the computing unit 12.

Figure 4:
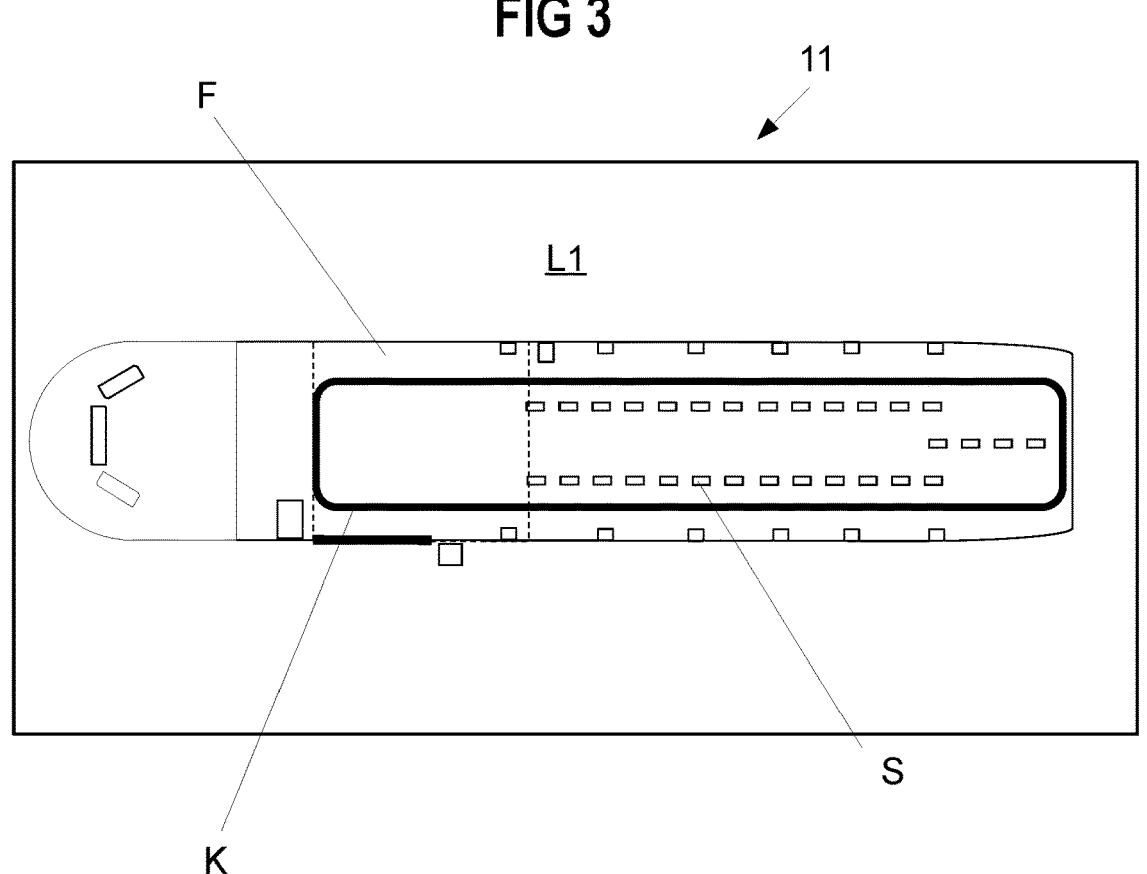
FIG. 4 shows an exemplary embodiment which represents a graphically visualized cargo space outline and a graphically visualized identification selection of active system components of the cargo loading system or an identification region on a display of the control device according to the invention.

According to the exemplary embodiment shown in FIG. 4, a selection switch element was actuated for a "single-row" loading configuration (=single-row central loading).

Therefore, a central region on the (virtual) cargo space outline, which corresponds to a region on the (real) cargo deck that is to be used for the loading is graphically visualized—for example, by lighting up or flashing or a corresponding colored highlight of an identification region K and/or an identification selection (see outlined thick black frame line in FIG. 4).

This region can either visualize a (virtual) (overall) arrangement of ULDs in this loading configuration (identification region K) and/or a region which displays all system components S (active or to be activated) required for this loading configuration (identification selection).

Figure 5:
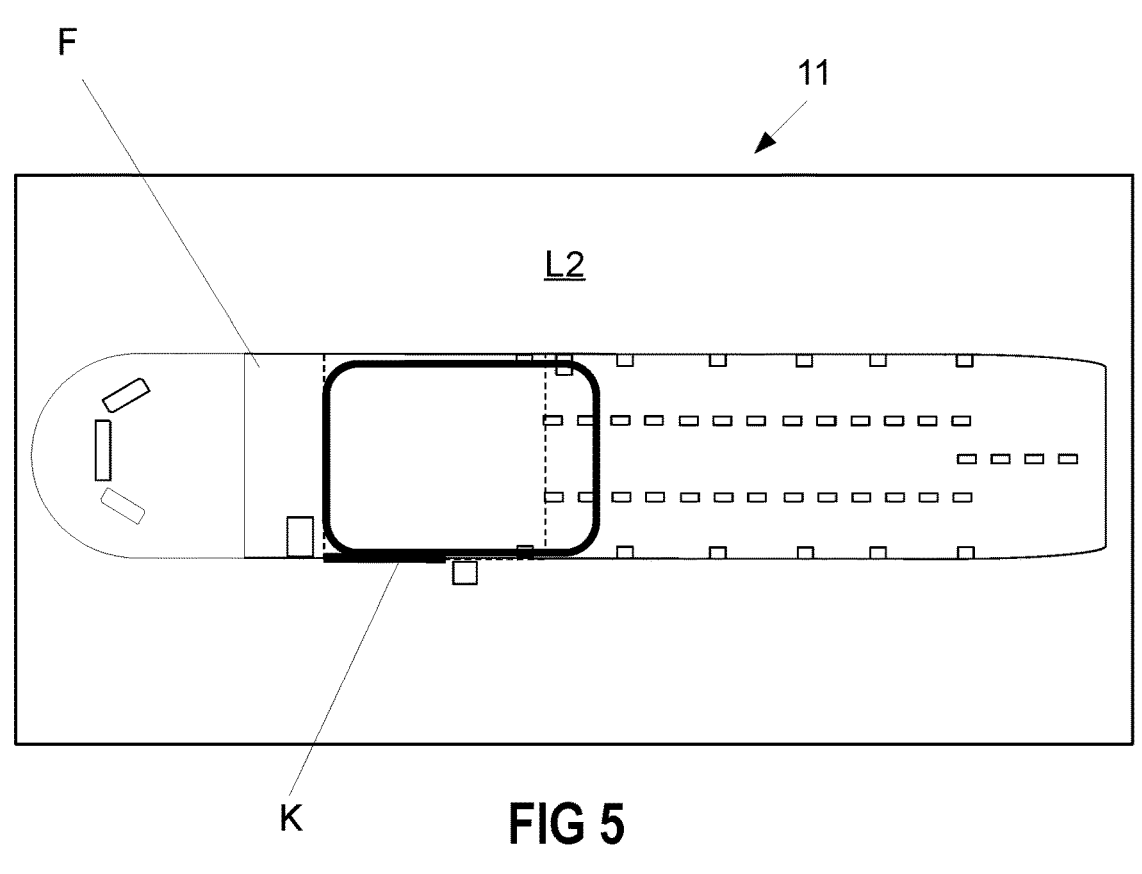
FIG. 5 shows an alternative exemplary embodiment which represents a graphically visualized cargo space outline and a graphically visualized identification selection of active system components of the cargo loading system or an identification region on a display of the control device according to the invention.

A further exemplary embodiment for an indication on the display 11 is shown in FIG. 5. In the exemplary embodiment shown in FIG. 5, an (identification) region K for positioning containers and/or pallets according to a loading configuration L2 is represented on the cargo space outline F.

This loading configuration L2 offers space for ULDs in a front region in the vicinity of the cargo door T according to the exemplary embodiment shown.

Figure 6:
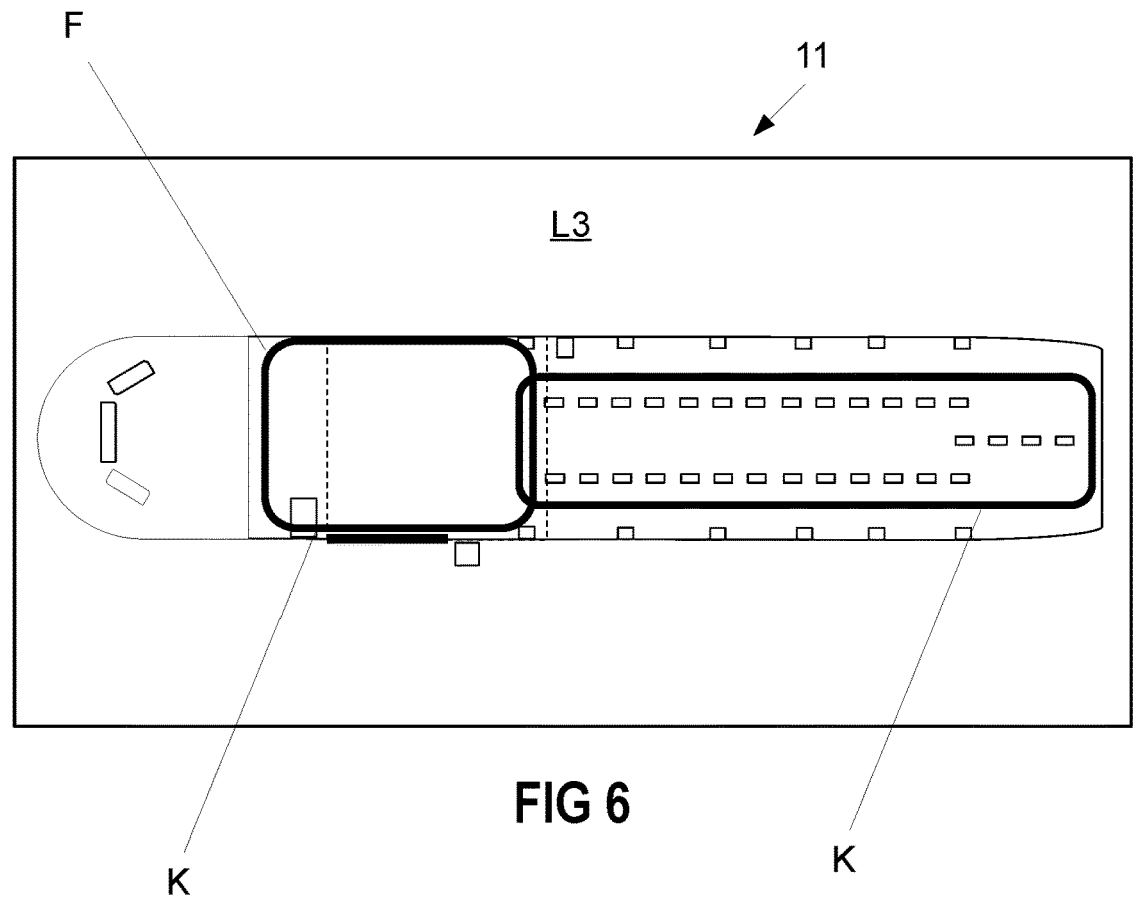
FIG. 6 shows a further alternative exemplary embodiment, which represents a graphically visualized cargo space outline and a graphically visualized identification selection of active system components of the cargo loading system or an identification region on a display of the control device according to the invention.

A further exemplary embodiment for an indication on the display 11 is shown in FIG. 6. In the exemplary embodiment shown in FIG. 6, an identification region K and/or an identification selection according to a loading configuration L3 is represented on the cargo space outline F.

In this exemplary embodiment, the display 11 indicates in accordance with an actuated selection switch element S1 to S4 that the loading is possible from the cargo door T up to the front region.

Additionally to a graphic or virtual indication of an identification region and/or an identification selection on the display 11, the control device 10 according to the invention is designed to visualize an optical indication of an identification region K directly (immediately) on the cargo deck. For this purpose, the control device 10 has multiple light source arrangements 13, 14. An exemplary embodiment which illustrates this schematically is shown in FIG. 7.

Figure 7:
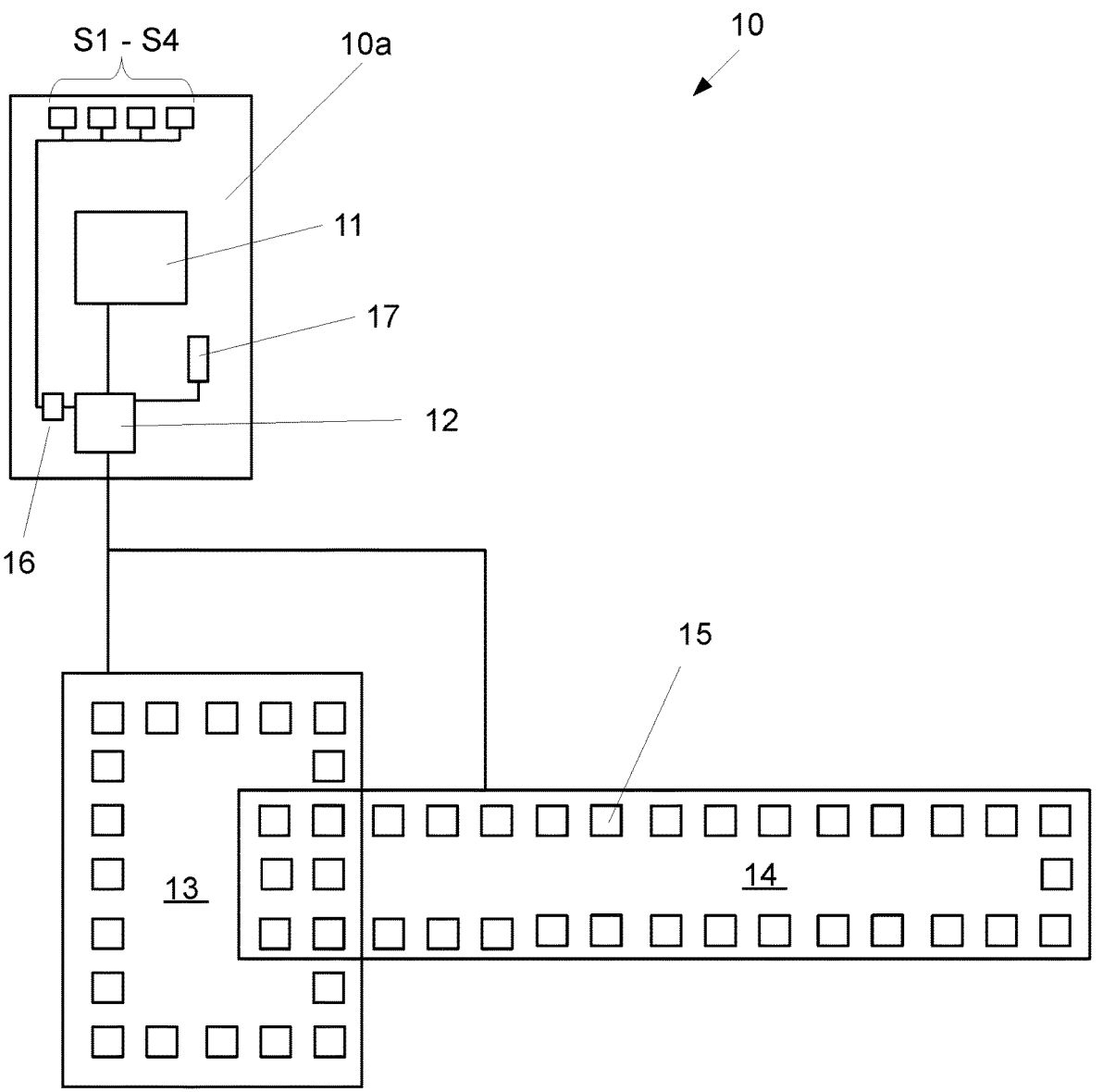
FIG. 7 shows a schematic illustration of an exemplary embodiment of a control device according to the invention having a display and two light source arrangements on the cargo deck.

The light source arrangements 13, 14 in FIG. 7 are each formed from multiple light sources 15, which are combined into groups. In one exemplary embodiment, the light sources 15 are designed as LEDs.

The light source arrangements 13, 14 or the second indicator device has a communicative connection to the computing unit 12, for example, via a bus system, to control them (in particular to switch them on and off).

In one exemplary embodiment, the light sources 15 can be arranged on system components S, for example, roller drive units and/or special light source holding arrangements in the roller tray, of the cargo system.

Figure 3:
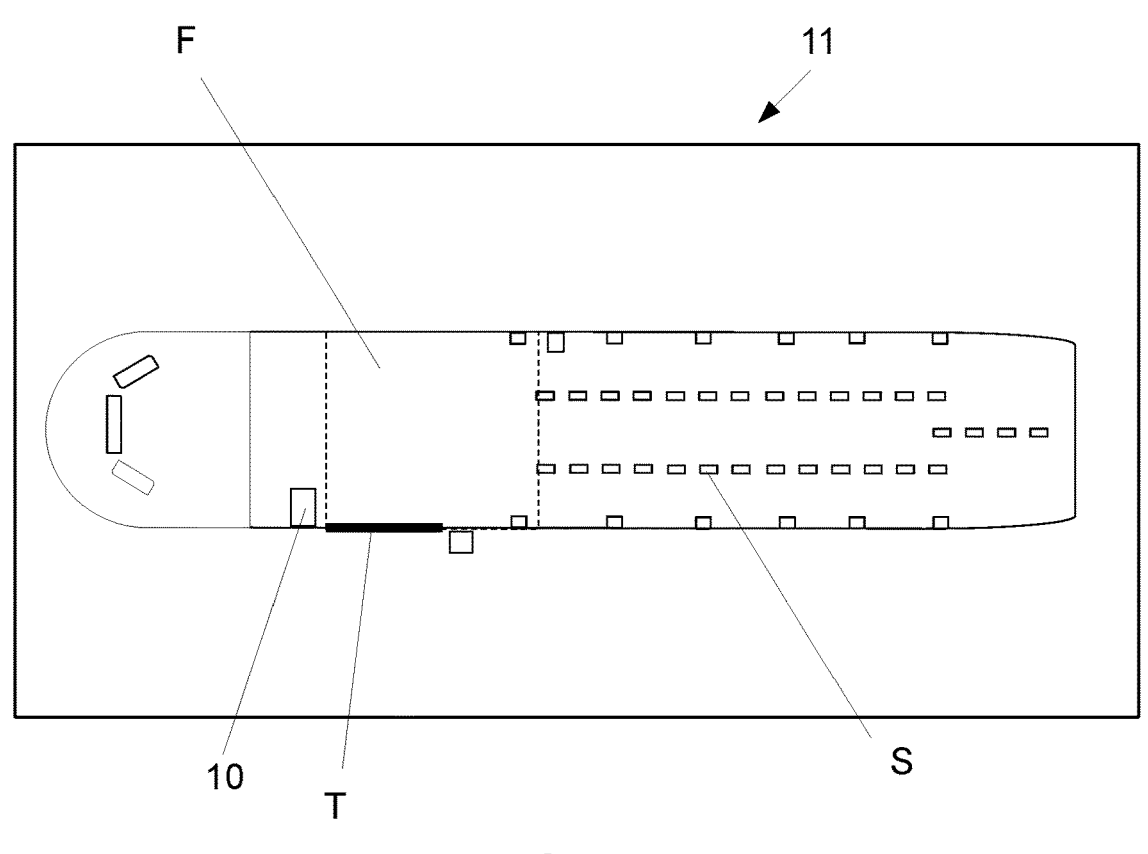
FIG. 3 shows an exemplary embodiment which represents a graphically visualized cargo space outline on a display of the control device according to the invention.

Specifically, this means the graphic representations of the identification regions K on the display 11 shown in the exemplary embodiments of FIGS. 3 to 5 are indicated simultaneously directly on the cargo floor by means of corresponding light source arrangements 13, 14.

In general, it is possible that an identification region K is indicated on the display 11, thus regions into which pieces of cargo are to be loaded, while the system components S required for this purpose are highlighted on the cargo deck. The reverse case may also be implemented. Thus that an identification selection of system components S is indicated on the display 11 and an identification region K is indicated on the cargo deck. Of course, however, display 11 and the second indicator device on the cargo deck can each also indicate the (same) identification region K or the (same) identification selection of system components S.

For the identification on the cargo deck, the light sources 15 or the light source arrangements 13, 14 can light up continuously (for example in different colors) or flash.

Furthermore, light sequences are also conceivable, in which the light sources 15 are activated or deactivated in series, for example. In this way, a loading speed (settable by means of the control device) of the ULDs could also be represented simulated by the light source arrangements.

In one refinement of the invention, it is possible that the first indicator device or the display 11 and/or the second indicator device or the light source arrangements 13, 14 indicate a corresponding target position of a specific ULD (according to the loading plan) in the cargo space (similarly to an identification region K).

For this purpose, the computing unit 12 has a communicative connection to readout devices on the cargo door, wherein the readout devices are designed to read out corresponding identification means on the ULDs, which are loaded through the cargo door into the cargo space.

Such identification means can be designed, for example, as RFID tags or Bluetooth tags or NFC tags. Relevant items of information with respect to the corresponding ULD (and its contents) can be stored on the identification means so they can be read out—for example, dimensions, weight, sender, receiver, etc.

These items of information acquired by means of the readout devices are compared to loading plan data by means of the control device or by means of the computing unit 12, wherein the loading plan data were received, for example, beforehand via a corresponding data transfer from an (airline) central office.

Tracking and locating the ULDs through the cargo space for real-time tracking on the display 11 is enabled by means of further readout devices for the identification means, which are arranged inside the cargo space. Alternatively or additionally, locating of the ULDs can be carried out or assisted by means of overlap sensors, which are arranged on corresponding system components S, for example, on PDUs.

At least on the display 11, for example, in this way a real-time position of a ULD can be tracked during a loading process by a corresponding visualization. A ULD can be visualized on the display 11 or on the virtual cargo space outline F, for example, by a corresponding rectangle (to scale).

To assist the loading personnel, furthermore a target position of a ULD provided for this purpose can light up directly on the cargo deck by means of the second indicator device or by means of the light source arrangements 13, 14 for orientation during the transport.

When a ULD is arrived and locked at the final (planned) position, further readout devices, which are arranged, for example, in the cargo floor, in/on roller trays, or in/on the side of the aircraft can ascertain the present loading position and transmit it to the computing unit 12.

A corresponding report of the present loading position can appear on the display 11 of the operating panel 10a of the control device. This report can then be confirmed by the loading personnel by actuating a confirmation button (for example ENTER) on the operating panel 10a.

Finally (after the loading process of all ULDs), the computing unit 12 or the control device can create a loading report in this way, which confirms the correct loading of the aircraft. This report can be sent, for example, via the computing unit 12 directly back to the (airline) central office. In addition to the correct loading configuration, the loading times are thus also documented.

It is to be noted at this point that, particularly with reference to the details illustrated in the drawings, features described in the context of separate embodiments can also be implemented in combination in a single embodiment. Conversely, various features that are described in the context of a single embodiment can also be implemented in multiple embodiments separately or in any suitable subcombination.

LIST OF REFERENCE SIGNS

L1-L4 loading configurations
S1-S4 selection switch elements
F cargo space outline
T cargo door
S system components
K identification region
10 control device
10a operating panel of the control device
11 display
12 computing unit
13, 14 light source arrangements
15 light source
16 storage unit
17 control means device

11

The invention claimed is:

1. A control device for a cargo loading system on a cargo deck of a cargo aircraft, the control device comprising:
   a plurality of selection switch elements each for selecting a loading configuration from a plurality of possible loading configurations;
   at least one first indicator device comprising a display for outputting a cargo space outline graphically representative of at least a portion of the cargo deck,
   at least one second indicator device having a plurality of light source arrangements to be arranged on the cargo deck, and
   a computing unit, which is configured to:
   a) determine the selected loading configuration based on signals from at least some of the selection switch elements;
   b) using the selected loading configuration, determine an identification region on the cargo deck where cargo is to be loaded and/or an identification selection of system components to be used in the selected loading configuration from a plurality of system components of the cargo loading system; and
   c) generate a graphical representation of the identification region and/or the identification selection on the display and generate an optical indication on the cargo deck of the identification region and/or the identification selection using the second indicator device, wherein the light source arrangements are arrangeable or arranged on the plurality of system components of the cargo loading system.

2. The control device according to claim 1, wherein the display is configured to generate the graphical representation of the identification region and/or the identification selection on the display in/as part of the cargo space outline.

3. The control device according to claim 1, wherein the computing unit has a communicative connection to the second indicator device.

4. The control device according to claim 3, wherein each light source arrangement has a plurality of light sources, and the light sources are combined into groups in such a way that the optical indication of the identification region and/or the identification selection on the cargo deck can be generated by means of the light source arrangements.

5. The control device according to claim 1, wherein the computing unit is configured to receive first and second control signals from at least one control means device and, in reaction to the first control signal, to determine the identification region on the cargo deck and/or the identification selection of system components, and/or, in reaction to the second control signal, to activate system components within the identification region and/or the identification selection of the system components.

6. The control device according to claim 1, wherein the computing unit is configured to communicate with a storage unit, wherein items of information with respect to the cargo space outline and/or items of information with respect to the plurality of loading configurations are stored on the storage unit.

7. A cargo loading system of a cargo aircraft, comprising a control device according to claim 1.

8. The cargo loading system of a cargo aircraft according to claim 7, wherein the at least one first indicator device is arranged at an operating panel in the vicinity of a cargo door of the cargo aircraft, and a plurality of light source arrangements are arranged on/in roller drive units of the cargo loading system to assist positioning of containers and/or pallets.

9. The control device according to claim 1, wherein the system components are roller drive units on the cargo deck.

10. A method for positioning containers and/or pallets on a cargo deck of a cargo aircraft by means of a control device according to claim 1, comprising the following steps:
   selecting a loading configuration from a plurality of possible loading configurations for containers and/or pallets on the cargo deck;
   determining an identification region on the cargo deck and/or an identification selection of system components using the selected loading configuration; and
   generating a graphical representation of the identification region or the identification selection on the at least one first indicator device in the cargo space and generating an optical indication on the cargo deck of the identification region or the identification selection using the at least one second indicator device on the cargo deck.

11. The method according to claim 10, wherein the graphical representation of the identification region or the identification selection is generated on the display with reference to the cargo space outline.

12. The method according to claim 10, wherein generating the optical indication on the cargo deck of the identification region or the identification selection using the at least one second indicator device comprises flashing and/or lighting up of light source arrangements.

13. The method according to claim 10, further comprising a control of system components within the identification region and/or the identification selection of system components.

14. A computer-readable (storage) medium, comprising instructions which, upon execution by at least one computing unit, cause it to implement a method according to claim 10.

* * * * *